United States Patent [19]
Walters et al.

[11] 4,153,348
[45] May 8, 1979

[54] ADJUSTABLE EYEGLASS TEMPLE

[75] Inventors: Eugene G. Walters, Orwigsburg; Heinz E. Ruck, Morton, both of Pa.

[73] Assignee: The Fibre-Metal Products Company, Concordville, Pa.

[21] Appl. No.: 812,827

[22] Filed: Jul. 5, 1977

[51] Int. Cl.² ............................................... G02C 5/20
[52] U.S. Cl. ...................................... 351/118; 351/119
[58] Field of Search ................................ 351/118, 119

[56] References Cited
U.S. PATENT DOCUMENTS
3,620,608  11/1971  Davis ................................ 351/118 X FOREIGN PATENT DOCUMENTS
645749  10/1928  France ..................................... 351/118
1545091  9/1968  France ..................................... 351/118

Primary Examiner—Paul A. Sacher
Attorney, Agent, or Firm—Eugene E. Renz, Jr.

[57] ABSTRACT

An eyeglass temple including a pair of telescopic temple members, the inner telescopic member having a longitudinal opening, and the outer telescopic member having a projection entering the opening for relative movement therealong upon telescoping of the members, the opening and projection being configured for retaining engagement with each other at selected positions of telescopic movement to maintain a desired adjustment.

10 Claims, 7 Drawing Figures

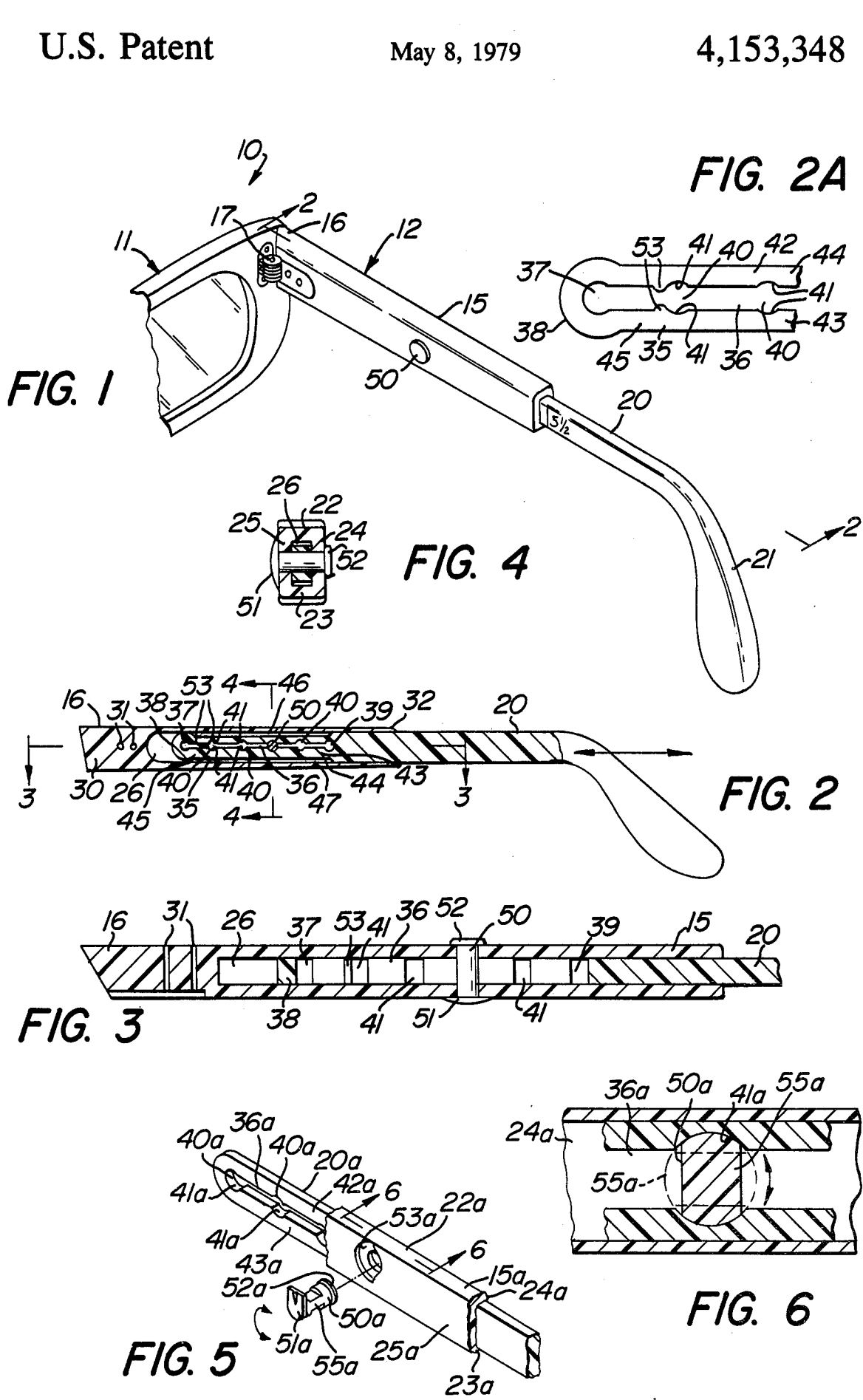

ADJUSTABLE EYEGLASS TEMPLE

BACKGROUND OF THE INVENTION

While there have, in the past, been proposed a number of constructions for adjusting the temples of spectacles, such adjustable temple constructions have not proved entirely satisfactory, and have therefore not found broad general acceptance. For example, prior adjustable temple constructions were often complex in structure so as to require expensive component parts and assembly, lacking in durability so as to break and malfunction under normally active conditions of spectacle use, and were also relatively difficult to properly set and maintain desired adjustment.

SUMMARY OF THE INVENTION

Accordingly, it is an important object of the present invention to provide a spectacle temple construction of adjustable character which overcomes the above-mentioned difficulties, is extremely simple in structure and design for economic manufacture and assembly of parts, wherein the components are highly durable and entirely reliable throughout a long useful life under normally active and even abusive conditions, and which are capable of being properly adjusted with extreme ease and maintain the proper adjustment once set, or be quickly and easily changed to another adjustment, as desired.

Other objects of the present invention will become apparent upon reading the following specification and referring to the accompanying drawings, which form a material part of this disclosure.

The invention accordingly consists in the features of construction, combination of elements, and arrangements of parts, which will be exemplified in the construction hereinafter described, and of which the scope will be indicated by the appended claims.

BRIEF DESCRIPTION OF THE DRAWINGS

FIG. 1 is a partial perspective view showing a spectacle side piece or temple, on the inner side thereof and hinged connection to the spectacle front piece.

FIG. 2 is a longitudinal sectional elevational view taken generally along the line 2—2 of FIG. 1.

FIG. 2a is a fragmentary side elevational view of a rear temple member apart from the remainder.

FIG. 3 is a longitudinal, generally horizontal plan view taken along the line 3—3 of FIG. 2.

FIG. 4 is a transverse sectional view taken generally along the line 4—4 of FIG. 2.

FIG. 5 is a partial perspective view showing a slightly modified construction of eyeglass temple in accordance with teachings of the present invention and broken away for clarity.

FIG. 6 is a partial longitudinal sectional elevational view taken generally along the line 6—6 of FIG. 5, and enlarged for ease of understanding.

DESCRIPTION OF THE PREFERRED EMBODIMENTS

Referring now more particularly to the drawings, and specifically to FIG. 1 thereof, there is illustrated a pair of eyeglasses or spectacles generally designated 10, including a spectacle front or front piece 11, and a spectacle side piece or temple 12. The spectacle front 11 extends across the front of a wearer's face, in front of the wearer's eyes, and the temple or side piece 12 has its forward end connected to one end region of the spectacle front, and extends rearwardly therefrom along the temple and side of a wearer's head, over the wearer's ears.

Considering the instant temple construction in greater detail, there is included a forward temple part or member 15, which may have its forward end region 16 proximate to the spectacle front 11, and swingably connected thereto, as by a hinge 17. Extending rearwardly from the forward temple member 15 is a rear temple member or part 20, which may extend over a wearer's ear, and may include a rearward ear curve 21, or other rearward configuration, such as the conventional paddle type.

The temple members 15 and 20 are in a longitudinally extensile and retractile telescopic relation with respect to each other, one being longitudinally shiftably received interiorly with respect to the other.

More specifically, the forward temple member 15 may be of an elongate, generally tubular configuration, say of generally rectangular cross section, including top and bottom walls 22 and 23, and outer and inner side walls 24 and 25, respectively, best seen in FIG. 4. The walls 22–25 combine to define in the space therebetween an internal hollow 26, see FIG. 2. The forward end region 16 of temple member 15 may be closed or solid as at 30, for securement, as by fasteners 31 to one element of hinge 17. The rearward end region 32 of forward temple member 15 may be open, for communication therethrough with the interior hollow 26 of the temple member.

The rear temple member 20 is of an elongate configuration, and may be of a cross section for conforming sliding forward end wise engagement into the interior hollow or space 26 of forward temple member 15. More specifically, the rearward temple member 20 may have formed in its forward region 35 a longitudinally extending opening or slot 36. That is, the longitudinal opening or slot 36 may terminate at its forward end in an enlarged portion 37 adjacent to and short of the forward distal end 38 of the rearward temple member. The rearward end of longitudinal opening or slot 36 terminates in a rearward enlarged portion 39 generally medially of the rearward temple member. As noted, the slot 36 opens laterally internally through the forward region 35 of the rearward temple member 20, between the slot end portions 37 and 39. In addition, at a plurality of longitudinally spaced locations along slot 36, spaced intermediate the slot end portions 37 and 39 are a series of enlarged slot portions 40. The slot portions 40 may each be defined by an opposed pair of facing cut-outs 41, which may be of generally concave, arcuate configuration for combination with the opposite cut-out to define a generally circular slot enlargement.

The longitudinally extending, laterally through slot 36 subdivides the forward region 35 of rearward temple member 20 into a pair of generally parallel, laterally spaced, longitudinally extending, upper and lower side pieces 42 and 43. The upper and lower side pieces 42 and 43 have their respective upper and lower regions removed or cut away, as at 44 and 45, so as to respectively space the upper and lower side pieces 42 and 43 from the adjacent, upper and lower walls 22 and 23 of forward, outer temple member 15.

That is, the upper side piece 42 is spaced from upper wall 22 by an upper space 46, and lower side piece 43 is spaced from lower wall 23 by a lower space 47. By the resilient nature of the rearward temple member or part 20, say being molded of suitable plastic, the upper and lower side pieces 42 and 43 are yieldably deflectable into their adjacent spaces 46 and 47, for a purpose appearing presently.

A transverse retaining member or pin 50 may be fixed relative to the forward exterior temple member 15, as by extension transversely thereacross between side walls 24 and 25 bridging the internal hollow 26. The pin 50 may be suitably fixed in position, as by external heads 51 and 52.

It should be noted that the shank of pin 50 may be generally cylindrical, as is shown as extending through one of the enlarged portions 40 of slot 36, being conformably engaged in the receiving enlarged slot portion. In the illustrated condition, the temple members 15 and 20 are releasably retained against relative extensile and contractile telescopic movement. More specifically, the pin or retainer 50 is engaged in a respective slot enlargement 40, conformably and substantially fully occupying the enlarged portion to effectively deter the interior rearward temple member 20 from longitudinal movement relative to the exterior forward temple member. However, upon deliberate, forcible relative telescoping movement of the temple members 15 and 20, the side pieces or portions 42 and 43 may be caused to resiliently deflect away from each other into the respective adjacent spaces 46 and 47. This effectively opens the slot 36 and permits relative movement along the slot of retaining member or pin 50. Viewed otherwise, the retaining member or pin 50 may be considered as camming the resiliently deflectable side portions 42 and 43 away from each other to open the slot 36 for relative telescopic movement of the temple members 15 and 20. Of course, the transverse pin or retainer 50 will snap into the next adjacent enlarged slot portion 40 for releasable retention in a different selected position of adjustment, as desired. This procedure may be continued until the pin 50 is located in any selected one of the enlarged portions 40. By reason of the extension of slot 36 beyond the outermost or distal enlarged portions 40, to the end portions 37 and 39, it will be appreciated that ample resilient deflectability is afforded to the side portions 42 and 43 to achieve the requisite opening of slot 36. However, pin 50 may not move toward slot end region 39, as when pin 50 is in the enlarged portion 40 adjacent to slot end portion 39 the rearward temple member 20 is in its forward limiting position, as is evident in FIG. 2. Also, pin 50 may not move from the forward most enlarged slot portion 40 toward the slot end region 37 by the provision of a slot constriction or limiting formation proximate to and just forward of the forward most enlarged slot portion 40, as at 53.

Considering now the slightly modified embodiment shown in FIGS. 5 and 6, the interior rearward temple member 20a is provided with a longitudinal opening or through slot 36a having a plurality of longitudinally spaced enlarged portions 40a.

The several enlarged portions 40a of slot 36a may be defined by generally arcuately concave cut-outs 41a.

The longitudinally extending, laterally through opening slot 36a may be considered as defining of the temple member material on opposite sides of the slot a pair of side pieces 42a and 43a. However, the side pieces 42a and 43a may not be cut away and need not be resiliently deflectable, as described in the embodiment of FIGS. 1–4. Hence, the rearward temple member 20a may substantially fully occupy the exterior forward temple member 15a for relative telescopic sliding therebetween.

The exterior forward temple member 15a may be generally tubular, as in the first described embodiment, including upper and lower side walls 22a and 23a, and outer and inner side walls 24a and 25a.

A transverse retaining member or pin 50a extends between the side walls 24a and 25a of tubular temple member 15a, being rotatably mounted therein, and passes laterally or transversely through elongate opening or slot 36a. The retaining member or pin 50a may be retained in one direction against withdrawal by an enlargement or head 52a exteriorly of wall 24a, and retained against withdrawal in the other direction by an enlargement or head 51a exteriorly of wall 25a. The retaining member or pin 50a is rotatable within limits defined by the radially extending configuration of end enlargement 51a within a generally sector shaped recess 53a in side wall 25a. Thus, the radially extending enlargement 51a is swingable in recess 53a approximately 90° for a purpose appearing presently.

The medial region 55a of pin 50a is of a noncircular, elongate cross sectional configuration, best seen in FIG. 6. It will there be apparent in solid lines, that the elongate transverse cross sectional configuration of mid-pin region 55a, which is located within slot 36a, is sufficient to substantially fully occupy an enlarged slot portion 40a, and thereby positively restrain the telescopic temple members 15a and 20a against extensile and retractile movement. However, upon rotation of pin 50a approximately 90°, as limited by radial end enlargement 51a in receiving recess 53a, to the phantom position shown in FIG. 6, the elongate medial pin region may then move within and relative to the slot 36a into position within another selected enlarged slot portion 40a. In this position, the pin 50a may be returned to its original angular position, as by rotation approximately 90°, to substantially fully occupy the receiving enlarged portion 40a and effectively prevent relative displacement between the telescopic temple members out of their adjusted relation.

From the foregoing, it is seen that the present invention provides an adjustable eyeglass temple construction which is extremely simple for ease and economy in manufacture and assembly, quick adjustment without special skill or instructions, extreme durability and reliability throughout a long useful life, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A pair of elongated members adapted for longitudinal adjusting movement relative to one another, a slotted opening in one of said members with a plurality of longitudinally spaced enlarged pocket portions, a pin mounted in a fixed position in the other member engaging through said slotted opening which seats in a selected one of said enlarged pocket portions of said slot to releasably retain said members in a selected position, said slot between said enlarged pocket portions being smaller in cross section than the cross section of the pin, said members being of a predetermined cross sectional relationship to permit flexing displacement of said other member upon longitudinal adjusting movement of said members relative to one another to permit positioning of said pin in a selected pocket portion of said slot, said slotted opening being resiliently yieldable for said pin movement and snap pin enlargement in said enlarged pocket portions.

2. An adjustable eyeglass temple comprising a forward member for hinged connection to an eyeglass front piece, a rearward member for extension over a wearer's ear, said forward and rearward members being in telescopic extensile and retractile relation with one member interiorly of the outer member, one of said members having an elongated channel therein, the other member engageable in said channel and having a slotted opening with a plurality of longitudinally spaced enlarged pocket portions, a pin mounted in a fixed position in said one member engaging through said slotted opening which seats in a selected one of said enlarged pocket portions of said slot to releasably retain said members in a selected position, said slot between said enlarged pocket portions being smaller in cross section than the cross section of the pin, said members being of a predetermined cross sectional relationship to permit flexing displacement of said other member upon longitudinal adjusting movement of said members relative to one another to permit positioning of said pin in a selected pocket portion of said slot, said slotted opening being resiliently yieldable for said pin movement and snap pin enlargement in said enlarged pocket portions.

3. An adjustable eyeglass temple according to claim 2, said elongated opening comprising a longitudinal slot.

4. An adjustable eyeglass temple according to claim 3, said enlarged pocket portions comprising a plurality of cut-outs spaced along and opening into said slot.

5. An adjustable eyeglass temple according to claim 4, said slot having its opposite ends extending beyond said cut-outs for sufficient resilient lateral deflection of said interior part to yieldably open said slot to snap engage said pin in the endmost cut-outs.

6. An adjustable eyeglass temple as claimed in claim 5 including means preventing lateral displacement of said members relative to one another beyond engagement of said pin in the endmost cut-outs.

7. An adjustable eyeglass temple according to claim 5, in combination with constriction means in said slot beyond the endmost cut-out at one end of said slot to prevent pin movement beyond said one endmost cut-out.

8. An adjustable eyeglass temple as claimed in claim 5 wherein the outer terminal ends of said slot are enlarged to about the same cross section of said pocket portions.

9. An adjustable eyeglass temple as claimed in claim 2 wherein the inner terminal end of said rearward member abuts the bottom of said channel when said pin is located in the outermost pocket portion of said slot remote from said inner terminal end of said rearward member.

10. An adjustable eyeglass temple as claimed in claim 2 wherein the cross section of said rearward member outboard of said slot in relation to said channel provides a close sliding fit and is reduced therebetween to permit flexing movement during movement of said pin between pocket portions without binding.

* * * * *